Patented May 12, 1931

1,804,458

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

PURIFICATION OF HALOGENATED HYDROCARBONS

No Drawing.  Application filed October 12, 1928. Serial No. 312,216.

This invention relates to the purification of benzo-trihalides or other side chain halogenated derivatives of toluene, whereby corrosion of apparatus and consequent contamination of the product may be avoided or prevented to a greater extent than is possible in existing commercial practice. To the accomplishment of the foregoing and related ends, the invention, then, consists of the steps hereinafter fully described and particularly pointed out in the claims, the following description setting forth in detail certain steps embodying the invention, such disclosed steps constituting, however, but several of the various ways in which the principle of the invention may be used.

My improved procedure may be illustrated by reference to the method for making benzoic acid which consists essentially in chlorinating toluene to form benzo-trichloride, purifying the latter by fractional distillation under vacuum, and then hydrolyzing such purified intermediate product to benzoic acid. The present invention is concerned more particularly with the purification step wherein the benzo-trichloride is fractionally distilled.

In the above mentioned process the chlorination of toluene is commonly carried out at boiling temperature or above in the presence of phosphorus trichloride or similar catalyst, and the crude reaction product consists of a mixture of side chain chlorinated toluene derivatives, chiefly benzo-trichloride, together with varying amounts of dissolved chlorine, hydrochloric acid and phosphorus compounds. In order to separate the principal product, benzo-trichloride, from the other accompanying chlorinated toluene derivatives, the crude mixture must be submitted to careful fractionation. Such fractionation, however, when conducted in the usual commercial equipment constructed from iron, steel, copper, Monel metal or other metal, is attended with serious corrosion of the equipment, owing to the presence of the above mentioned inorganic impurities, as well as with loss of product due to side-reactions set up through the catalytic action of metallic salts resulting from such corrosion.

It has been proposed to utilize enamel-lined or stoneware equipment for the distillation, but such equipment is lacking in strength and durability, and furthermore is more difficult to construct and operate. An apparatus built of the structural metals hereinbefore referred to is easier and safer to control and operate, aside from the difficulty of corrosion. I have found that the aforesaid inorganic impurities may be substantially completely removed if the crude reaction mixture is washed with water or an aqueous alkaline solution previous to the distillation step, and that such distillation may then be conducted in any of the usual forms of metallic apparatus without corrosion of the latter or deterioration of the product.

In proceeding in accordance with my invention, the crude product from the chlorination step may be first blown with air, or warmed slightly to a temperature not much above 30° C. while held under partial vacuum, in order to remove by such means as much of the corrosive impurities as possible. After such preliminary treatment the chlorinated mixture is then thoroughly agitated with water or a dilute solution of caustic soda, sodium carbonate or other alkaline compound. During the washing the temperature is preferably maintained below about 70° C. in order to avoid hydrolysis of the benzo-trichloride. Thereupon the water layer is separated and the washed product is dried by treatment with a drying and/or absorbing agent such as calcium chloride or fuller's earth. The washed and dried reaction mixture may then be distilled in the usual metallic equipment without corrosive action thereon.

The above described treatment is equally applicable generally to processes involving the distillation of mixtures obtained from the chlorination or bromination of toluene or derivatives thereof, such as benzyl chloride, benzal chloride, nitro-benzyl chloride, chlor-benzo trichloride, etc., due regard, of course, being given to the volatility of the substances to be treated and the exact procedure being suitably modified in accordance therewith.

Other modes of applying the principle of my invention may be employed instead of those explained, change being made as regards the process herein disclosed, provided the means stated by any of the following claims or the equivalent of such stated means be employed.

I therefore particularly point out and distinctly claim as my invention:—

1. The method of treating the reaction product resulting from the direct action of a halogen upon toluene in the presence of a halogenating catalyst wherein side-chain halogenation chiefly occurs, which comprises washing such product with an aqueous medium to remove inorganic impurities, drying and then distilling the so purified product in contact with metallic surfaces.

2. The method of treating the reaction product resulting from the direct action of a halogen upon toluence in the presence of a halogenating catalyst wherein side-chain halogenation chiefly occurs, which comprises washing such product with an aqueous alkaline medium to remove inorganic impurities, drying and then distilling the so purified product in contact with metallic surfaces.

3. The method of preparing benzo-trichloride, which comprises chlorinating toluene at about boiling temperature in the presence of phosphorus trichloride, washing the crude reaction product with an aqueous medium to remove inorganic impurities, drying and fractionally distilling the so purified product in contact with metallic surfaces.

4. The method of preparing benzo-trichloride, which comprises chlorinating toluene at about boiling temperature in the presence of phosphorus trichloride, washing the crude reaction product with an aqueous alkaline medium to remove inorganic impurities, drying and fractionally distilling the so purified product in contact with metallic surfaces.

5. The method of preparing benzo-trichloride, which comprises chlorinating toluene at about boiling temperature in the presence of phosphorus trichloride, blowing out the crude reaction product with air, then washing with an aqueous medium and fractionally distilling the so purified product in contact with metallic surfaces.

6. The method of preparing benzo-trichloride, which comprises chlorinating toluene at about boiling temperature in the presence of phosphorus trichloride, blowing out the crude reaction product with air, then washing with an aqueous alkaline medium and fractionally distilling the so purified product in contact with metallic surfaces.

7. The method of treating the reaction product resulting from the direct action of chlorine upon toluene in the presence of phosphorus trichloride wherein side-chain chlorination chiefly occurs, which comprises washing such product with an aqueous medium to remove corrosive impurities, drying and then distilling the so purified product in contact with metallic surfaces.

8. The method of treating the reaction product resulting from the direct action of chlorine upon toluene in the presence of phosphorus trichloride wherein side-chain chlorination chiefly occurs, which comprises washing such product with an aqueous alkaline medium to remove corrosive impurities, drying and then distilling the so purified product in contact with metallic surfaces.

Signed by me this 8th day of October, 1928.

EDGAR C. BRITTON.